No. 892,039. PATENTED JUNE 30, 1908.
H. F. FISCHER & M. H. DETTE.
ICE CUTTING MACHINE.
APPLICATION FILED OCT. 9, 1907.

4 SHEETS—SHEET 1.

Witnesses:
D. W. Gardner.
J. W. Anderson.

Inventors:
Henry F. Fischer
Max H. Dette
By their Attorney
Geo. Wm. Miatt

No. 892,039.          PATENTED JUNE 30, 1908.
H. F. FISCHER & M. H. DETTE.
ICE CUTTING MACHINE.
APPLICATION FILED OCT. 9, 1907.

4 SHEETS—SHEET 2.

Witnesses:
D. W. Gardner.
J. W. Anderson.

Inventors:
Henry F. Fischer
Max H. Dette
By their Attorney
Geo. W. Miatt

No. 892,039. PATENTED JUNE 30, 1908.
H. F. FISCHER & M. H. DETTE.
ICE CUTTING MACHINE.
APPLICATION FILED OCT. 9, 1907.

4 SHEETS—SHEET 3.

Witnesses:
D. W. Gardner.
J. W. Anderson

Inventors:
Henry F. Fischer
Max H. Dette
By their Attorney
Geo. Wm. Wiatt

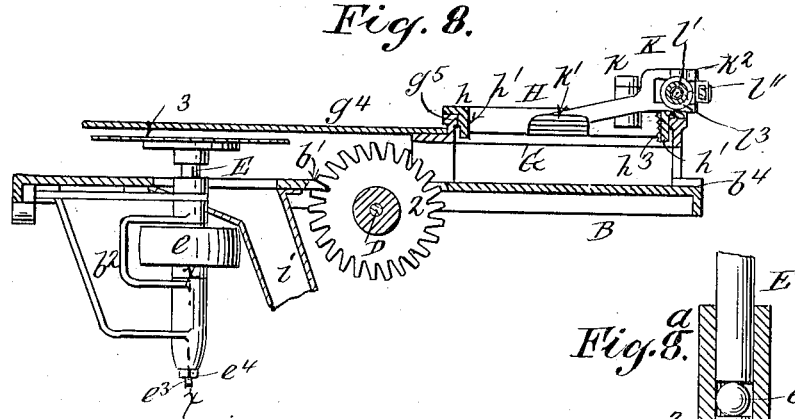
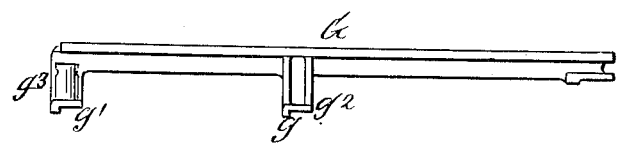
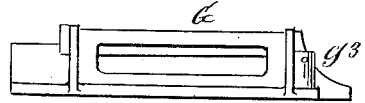
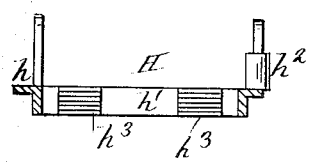
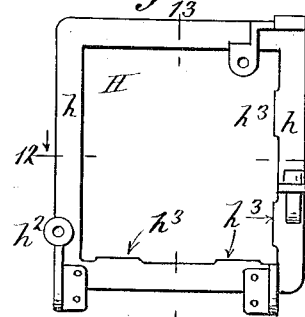
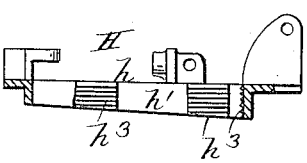
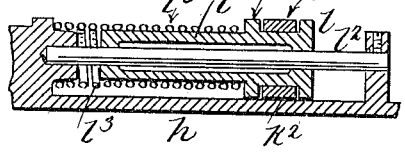

UNITED STATES PATENT OFFICE.

HENRY F. FISCHER, OF CORONA, NEW YORK, AND MAX H. DETTE, OF WOODCLIFF, NEW JERSEY, ASSIGNORS TO P. PRYABIL ESTATE, OF NEW YORK, N. Y.

ICE-CUTTING MACHINE.

No. 892,039.

Specification of Letters Patent.

Patented June 30, 1908.

Application filed October 9, 1907. Serial No. 396,643.

*To all whom it may concern:*

Be it known that we, HENRY F. FISCHER and MAX H. DETTE, citizens of the United States, residing, respectively, at Corona, Queens county, State of New York, and at Woodcliff, Hudson county, State of New Jersey, have invented certain new and useful Improvements in Ice-Cutting Machines, of which the following is a specification.

Our invention relates to the class of cutting machines designed to saw rectangular sections of ice from a block thereof, our main object being to attain simplicity both in structure and operation to the end that the machine may be successfully manipulated by unskilled labor.

Incidentally we produce a comparatively cheap, substantial apparatus which, while adapted to the requirements of small consumers has a capacity for cutting large quantities of ice in a comparatively short time,—since the manipulations involved are simple and may be safely executed with expedition.

Figure 1:
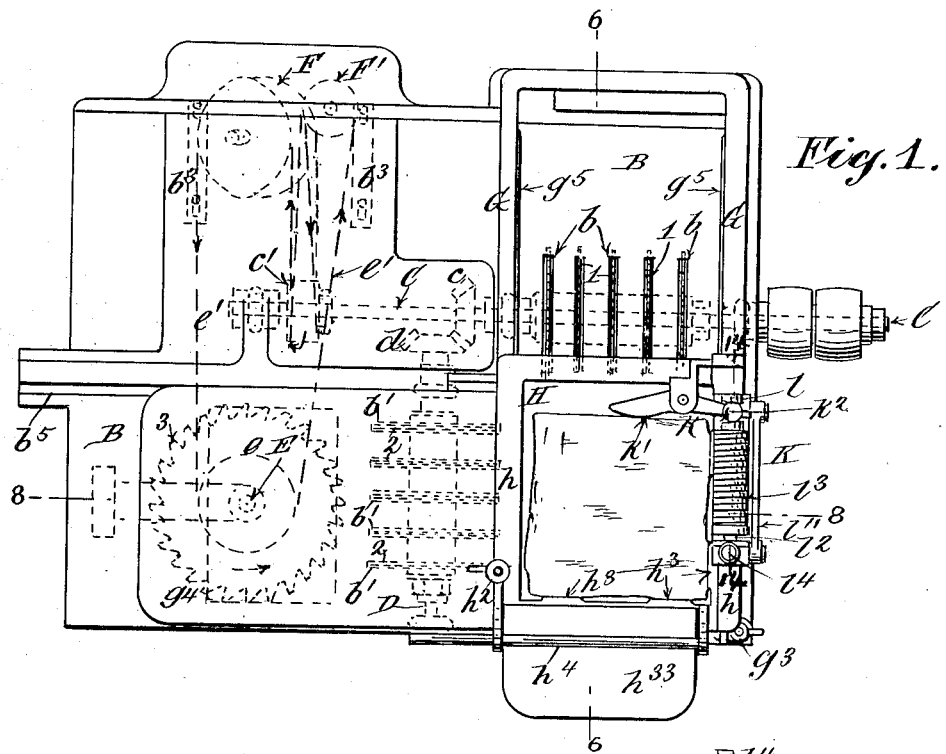
Figure 2:
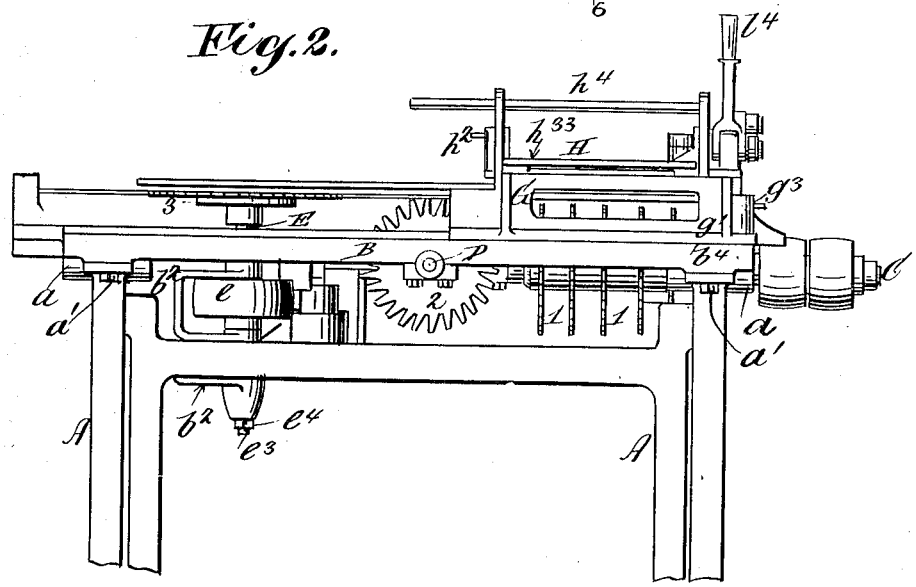
Figure 3:
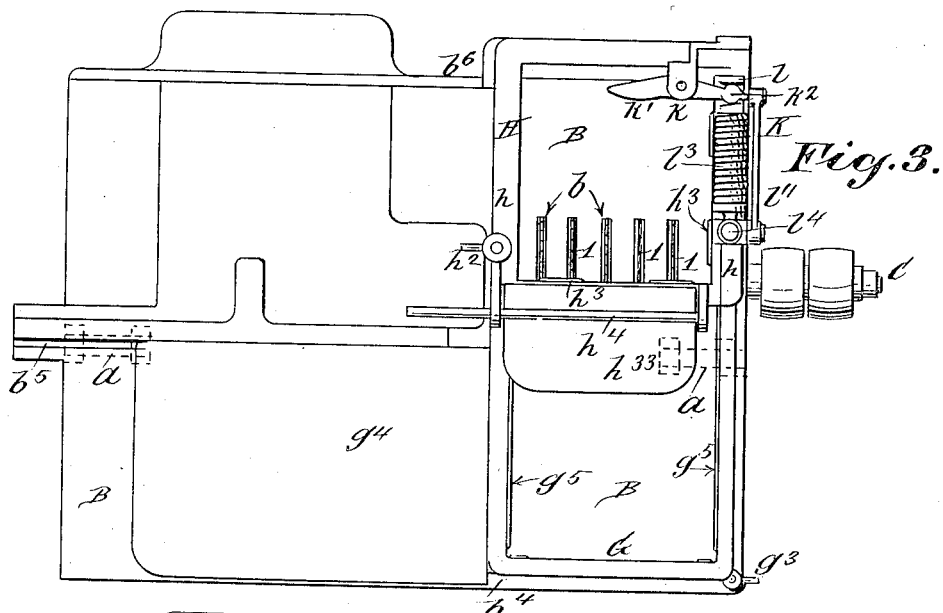
Figure 4:
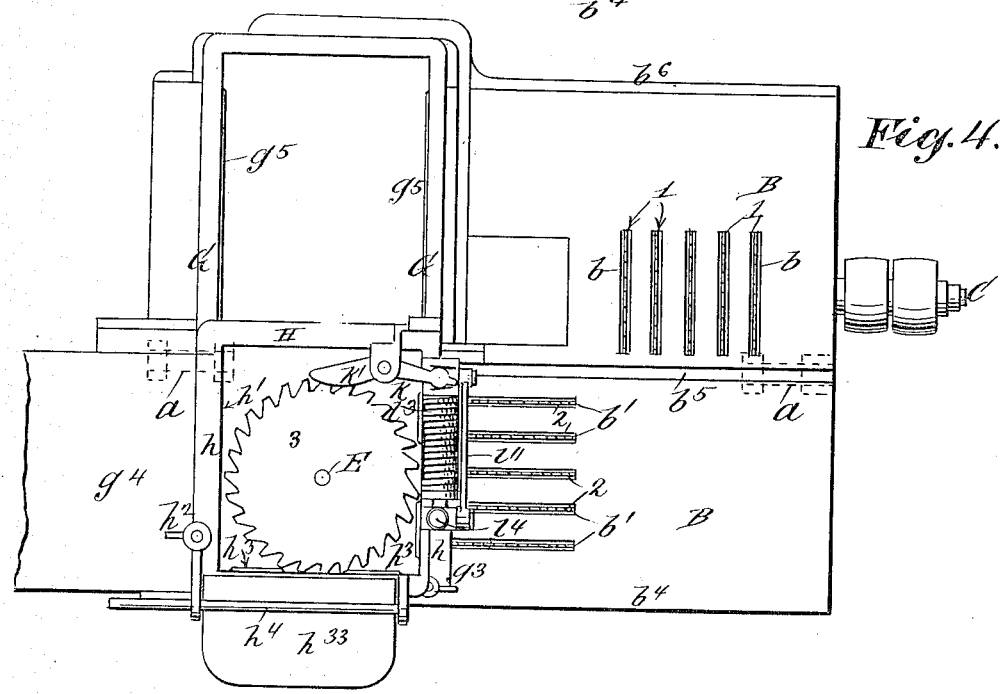
Figure 5:
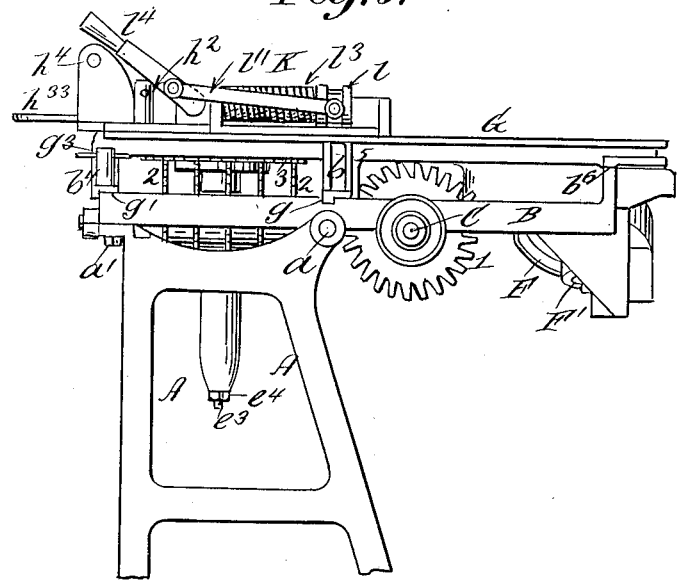
Figure 6:
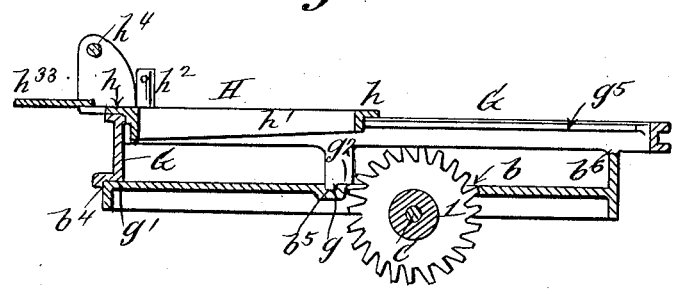
Figure 7:
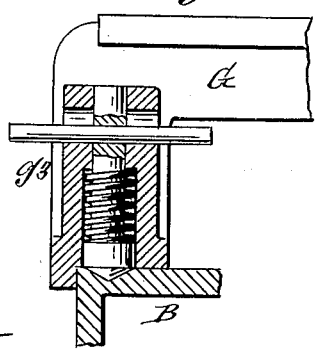

In the accompanying drawings, Figure 1, is a plan of our machine; Fig. 2, is a front elevation; Fig. 3, is a plan showing the ice holder advanced over the primary set of saws; Fig. 4, a like view showing the carriage and ice holder advanced over the secondary set of saws and the severing saw; Fig. 5 is an elevation of the right hand end of the machine; Fig. 6, a section on plane of line 6—6—Fig. 1; Fig. 7, an enlarged sectional detail of the carriage latch; Fig. 8, a section on line 8—8—Fig. 1; Fig. 8ª, a sectional detail on an enlarged scale taken on plane of line x—x—Fig. 8; Fig. 9, a side elevation of the carriage frame; Fig. 10, an end elevation of the same; Fig. 11, a plan of the holding frame; Fig. 12, is a section on plane of line 12—12— Fig. 11; Fig. 13, is a section upon plane of line 13—13— Fig. 11; Fig. 14, is a sectional detail on an enlarged scale on plane of line 14—14— Fig. 1.

A, represents the frame work generally, upon which the table B is supported, being preferably hinged thereto, as at $a, a$, and held in its normal position thereon by screw bolts $a', a'$, or equivalent means, so that access may be conveniently had when desired to the under or reverse side of the table. That is to say, by releasing the fastening devices $a', a'$, the table B may be swung upon its pivotal points of support $a, a$, into an approximately upright position. As all the operative parts are mounted upon the table B the advantage of thus supporting the table is obvious.

C is the power shaft mounted upon the under side of the table in suitable bearings, and carrying a series of what may be designated as primary circular saws 1, 1, the peripheries of which protrude through slots $b$, $b$, in the table B. A miter gear $c$, on the power shaft C engages with a corresponding gear $d$, on the end of a shaft D, mounted on the underside of the table at right angles to the said power shaft C. This secondary shaft carries a secondary series of circular saws 2, 2, the peripheries of which protrude through slots $b', b'$, in the table B. Beyond this secondary set of saws 2, 2, is adjustably mounted a single saw 3 in a plane at right angles to the planes of the saws 2 2. This single saw 3 which may be designated as the detaching saw is supported upon an arbor E, mounted in suitable bearings in a bracket $b^2$, secured to the under side of the table B, said arbor E carrying a pulley $e$, which is driven by a belt $e'$, passing over the idlers F and F' (mounted on brackets $b^3$, on the under side of the table B) and over the pulley $c'$, on the power shaft C. The primary and secondary sets of saws 1, 1, and 2, 2, are preferably arranged in vertical planes, and the severing saw in a horizontal plane although this is not essential provided the relative arrangement of the several saws is maintained.

Provision is made for adjusting the detaching saw 3 in any suitable manner, as by an adjustable step for the arbor E as shown in Fig. 8ª, in which the arbor is supported upon a ball $e''$, resting upon the follower $e^2$, which is regulated in position by means of the screw $e^3$, and lock nut $e^4$. Obviously the height of the detaching saw 3 above the surface of the table will determine the depth of the rectangular sections of ice severed from the bottom of the block thereof in the holder H. Hence, ice sections of various lengths and thicknesses of rectangular parallelepipedal form, as square flat plates, cubes, or other rectangular parallelograms, may be attained by the adjustment of the detaching saw 3; and the number and distance apart of the saws in either or both of the series 1 and 2, may also be varied to attain different results in the size and shape of the ice sections, although the latter will necessarily always be rectangular in outline.

A rectangular carriage G rests upon ways $b^4$, $b^5$, $b^6$, on the top of the table, said ways being parallel to the planes of the secondary set of saws 2, 2. The intermediate way $b^5$, is a groove in which rest tongues $g$, $g$, on the carriage G (see Figs. 5 and 6) which is also formed with bearing surfaces $g'$, and $g^2$, for engagement with the ways $b^4$, and $b^5$.

The carriage G is locked in its retracted position on the right of the table B by means of a spring latch $g^3$, shown in detail in Fig. 7, or by any other well known mechanical expedient. Attached to the left side member of the carriage G is a shield $g^4$, which is of sufficient extension to cover the secondary saws 2, 2, and the detaching saw 3 when the carriage is retracted, so that all danger of accidental contact with said saws is avoided.

The longitudinal side members of the carriage G are parallel, and constitute ways upon which the ice holder H, travels.

The ice holder H consists essentially of a rectangular frame the side members of which are rectangular in cross section, the upper and outer flanges $h$, $h$, resting upon the longitudinal side members of the carriage G and their inner flanges $h'$, $h'$, engaging with facings $g^5$, $g^5$, on said longitudinal members of the carriage; or any other arrangement of parts may be resorted to that will admit of the reciprocation of the ice holding frame H upon the carriage. The ice holding frame when in its retracted position is locked to the carriage G, by means of a spring latch $h^2$, like unto that shown in Fig. 7. $h^{33}$ is a shield attached to the front of the frame H, to guard against contact with the primary saws 1, 1, when the frame is passed over them; and $h^4$, is a handle by which both the ice frame H and the carriage G are moved as hereinbefore set forth. The depth of the ice holding frame is such that its lower edges are above the plane of action of the saws; and the longitudinal side members of the carriage are also open and above said plane except where the bearings $g'$ and $g^2$, occur.

The block of ice is held in the frame H by any suitable clamping device K. In the form shown in the drawings, $k$ is a jaw pivoted to the frame and having a bearing limb $k'$, which is ribbed horizontally, and an outer bifurcated arm $k^2$, which straddles the shouldered head $l$, of a sleeve $l'$, slidable upon a bar $l^2$. Between the shouldered head $l$, and a fixed part of the holder H, a spring $l^3$, is interposed which tends constantly to thrust the bearing limb $k'$, of the jaw inward against the block of ice when placed in position in the frame H. The jaw $k$, is retracted against the resistance of the spring $l^3$, by means of a lever $l^4$, pivotally connected with the head $l$, of the link $l''$. The inner sides of the holder H are formed with contacts $h^3$, for the ice, which are ribbed horizontally to insure a substantial hold or purchase on the ice and to support it against all tendency to slip vertically.

In practice the parts being in the position shown in Fig. 1, the bearing $k'$, is retracted by means of the lever $l^4$, and a block of ice placed on the table within the holder H, with two of its sides resting against the ribbed contacts $h^3$, as indicated. The lever $l^4$, being now released, the spring $l^3$, forces the bearing $k'$, against the opposed side of the block of ice, thereby locking it firmly in position within the holder H, and practically suspending it thereon, so that it is supported independently of the underlying surface of the table. The spring latch $h^2$, is then raised and the ice holder advanced over the primary set of saws 1, 1, as shown in Fig. 3, and then retracted to its former position where it is again locked to the carriage G, by the spring latch $h^2$. The spring latch $g^3$, is now raised and the carriage G and holder H moved from right to left over the secondary set of saws 2, 2, and the detaching saw 3 as shown in Fig. 4, the sections of ice falling from the latter into a suitable receiver or conduit $i$. The carriage is now retracted to its former position and again locked to the table by the spring latch $g^3$. The block of ice being now released by means of the lever $l^4$, falls by gravity to the surface of the table when it is again clamped by the release of the lever, and the operations above described repeated.

What we claim as our invention and desire to secure by Letters Patent is,

1. In a machine of the character designated, the combination of two series of vertical circular saws, one series arranged at right angles to the other, a horizontal circular saw arranged behind one of said series of vertical saws, means for operating all of said saws, an ice holding frame slidable transversely to the line of travel of the carriage on which it is mounted, and said carriage slidable upon the table of the machine, whereby the first cut may be made by means of the ice holding frame while the carriage is stationary and the second cut may be made by means of the carriage while the ice holding frame is locked in position thereon, for the purpose described.

2. In a machine of the character designated, the combination of two series of circular saws, one arranged at right angles to the other, a circular saw arranged behind one of said series of saws and in a plane at right angles thereto, means for operating all of said saws, an ice holding frame slidable transversely to the line of travel of the carriage on which it is mounted, and said carriage slidable upon the table of the machine whereby the first cut may be made by means of the ice holding frame while the carriage is stationary and the second cut may be made by means of the carriage while the ice holding frame is locked in position thereon, for the purpose described.

3. In a machine of the character designated, the combination of two series of circular saws one arranged at right angles to the other, a circular saw arranged behind one of said series of saws and in a plane at right angles thereto, means for operating all of said saws, an ice holding frame slidable transversely to the line of travel of the carriage on which it is mounted, said carriage slidable upon the table of the machine, and a clamp on the ice holding frame arranged to secure the ice therein, whereby the first cut may be made by means of the ice holding frame while the carriage is stationary and the second cut may be made by means of the carriage while the ice holding frame is locked in position thereon, for the purpose described.

4. In a machine of the character designated, the combination of two series of circular saws one arranged at right angles to the other, a circular saw arranged behind one of said series of saws and in a plane at right angles thereto, means for operating all of said saws, an ice holding frame slidable transversely to the line of travel of the carriage on which it is mounted, said carriage slidable upon the table of the machine, and a spring clamp on the ice holding frame to hold the ice therein, whereby the first cut may be made by means of the ice holding frame while the carriage is stationary and the second cut may be made by means of the carriage while the ice holding frame is locked in position thereon, for the purpose described.

5. In a machine of the character designated, the combination of two series of circular saws one arranged at right angles to the other, a circular saw arranged behind one of said series of saws and in a plane at right angles thereto, means for operating said saws, an ice holding frame slidable transversely to the line of travel of the carriage on which it is mounted, means for locking the said ice holding frame to the carriage, said carriage slidable upon the table of the machine, and means for locking the carriage to the table, whereby the first cut may be made by means of the ice holding frame while the carriage is stationary and the second cut may be made by means of the carriage while the ice holding frame is locked in position thereon, for the purpose described.

6. In a machine of the character designated, the combination of primary and secondary sets of circular saws arranged at right angles to each other, a circular ice detaching saw arranged behind the secondary set of saws and in a plane at right angles thereto, means for operating all of said saws, a carriage slidable upon the frame of the machine, a shield on said carriage covering the secondary set of saws and the ice detaching saw, and an ice holding frame mounted upon and slidable transversely to the line of travel of said carriage whereby the first cut may be made by means of the ice holding frame while the carriage is stationary and the second cut may be made by means of the carriage while the ice holding frame is locked in position thereon, for the purpose described.

7. In a machine of the character designated, the combination of primary and secondary sets of circular saws arranged at right angles to each other, a circular ice detaching saw arranged behind the secondary set of saws, and in a plane at right angles thereto, means for operating all of said saws, a carriage slidable upon the frame of the machine, an ice holding frame mounted upon and slidable transversely to the line of travel of said carriage, and a shield on said ice holding frame arranged to cover the primary set of saws when the frame is advanced over said saws whereby the first cut may be made by means of the ice holding frame while the carriage is stationary and the second cut may be made by means of the carriage while the ice holding frame is locked in position thereon, for the purpose described.

8. In a machine of the charater designated, the combination of two series of vertical saws, one series arranged at right angles to the other, a horizontal circular saw arranged behind one of said series of vertical saws means for adjusting said horizontal saw vertically, means for operating all of said saws, an ice holding frame slidable transversely to the line of travel of the carriage on which it is mounted and said carriage slidable upon the table of the machine whereby the first cut may be made by means of the ice holding frame while the carriage is stationary and the second cut may be made by means of the carriage while the ice holding frame is locked in position thereon for the purpose described.

9. In a machine of the character designated, the combination with the table, of two series of circular saws, one arranged at right angles to the other, a circular saw arranged behind one of said series of circular saws and in a plane at right angles thereto, means for adjusting said circular saw with relation to the table, means for operating all of said saws, an ice holding frame slidable transversely to the line of travel of the carriage on which it is mounted and said carriage slidable upon the table of the machine whereby the first cut may be made by means of the ice holding frame while the carriage is stationary and the second cut may be made by means of the carriage while the ice holding frame is locked in position thereon, for the purpose described.

HENRY F. FISCHER.
MAX H. DETTE.

Witnesses:
D. W. GARDNER,
GEO. WM. MIATT.